United States Patent Office 3,080,971
Patented Mar. 12, 1963

3,080,971
METHOD OF ROTARY PRECOAT FILTERING
Francis B. Hutto, Jr., Bound Brook, and George R. Bell, Martinsville, N.J., assignors to Johns-Manville Corporation, New York, N.Y., a corporation of New York
No Drawing. Filed Mar. 20, 1959, Ser. No. 800,658
2 Claims. (Cl. 210—75)

This invention relates to a method of filtering, and more particularly to an improved method of rotary precoat filtration.

Rotary precoat filtration procedures, as are well understood in the art, typically comprise rotating a cylindrical filter drum or chamber to continuously submerge a segment or portion of the peripheral screen filtering surface, carrying a vacuum- or pressure-held filter medium consisting essentially of a permeable bed or cake of filter aid, into the suspension or slurry of liquid and solids to be filtered, the pressure differential inducing passage of the liquid filtrate component of said suspension or slurry through the filtering medium, thereby separating the same from the solids, which are retained on the surface of, or entrapped within the interstices of the precoat cake adjacent to the surface. Collection and retention of the solids on the surface and within the interstices of the filter medium adjacent the surface, however, fill and thus block the pores or interstices, inhibiting further passage and separation of filtrate which necessitates the removal of the surface portion of the precoat cake containing the retained and entrapped solids to permit further filtration. In rotary precoat filtration procedures this removal of retained solids is typically effected by means of a continuously advancing doctor knife or blade which penetrates into the precoat cake to a depth approximately that reached by the entrapped solids. Thus, uninterrupted filtration through rotation of the cylindrical filter drum is permitted by the continuous cutting away and removing of the retained solids with their entrapping precoat cake and in turn exposing a substantially uncontaminated new surface for further filtration. Once the progressively advancing knife reduces the precoat cake to the minimum thickness necessary for satisfactory filtration, the filtering cycle must be halted while a new or additional precoat is applied. Application of the precoat may be effected by any conventional means of applying a permeable cake of substantially non-compressible filter aid upon the screen filtering surface of the cylindrical filter drum. Also, filter aids of like or unlike composition may additionally be admixed directly with the suspension or slurry of liquid and solids to be filtered to facilitate separation of the liquid and solid components by reducing the tendency of the solids to slime the surface of the precoat.

Filtering cycles of maximum duration for rotary precoat filters operating according to the foregoing procedure are achieved by applying or accumulating a maximum depth of expendable precoat cake on the filtering screen or surface to substantially reduce the frequency of costly down time. However, the particulate filter aid comprising the precoat must be of sufficiently large particle size, e.g., have at least about 75% of its particles of an average effective diameter greater than 5 microns, to provide adequate permeability for passage of the filtrate liquid. However, solids quickly fill the interstices of the precoat cake at the surface, impeding the flow of the filtrate, and penetrate into the permeable precoat, requiring relatively heavy cutting and rapid removal of the contaminated cake to maintain satisfactory filtration rate.

It is a primary object of this invention to provide, for a rotary precoat filter, an improved operating method which materially reduces the total amount of filter aid utilized without impairing clarity, flow rate or other desirable or essential features.

It is also a primary object of this invention to provide an improved method of operating a rotary precoat filter which results in substantially faster flow rates with filtrate clarity at least equivalent to or better than former but comparable methods.

It is a still further object of this invention to provide an economical method of operating a rotary precoat filter exemplified by the vacuum or pressure differential type, which method permits a substantial cost reduction by diminishing the total filter aid requirements and increasing filtrate flow rates without deleterious or diminishing effects upon the filtering procedure or the results thereof.

Further objects and advantages of this invention will become apparent and be more fully understood by reference to the following more detailed description.

The foregoing as well as other objects and advantages are achieved by admixing with the suspension or slurry of liquid and solids, prior to filtration of the same, relatively small amounts of a substantially non-compressive, finely divided, filter aid having at least about one-half of its particles of an average effective diameter less than 5 microns. The finely divided filter body aid should be admixed or combined with the material to be filtered in amounts ranging approximately from 25 to 500 lbs. per 1000 gals., depending upon the nature of the solids to be removed.

Suitable filter aid materials preferably consist of any conventional highly structured (i.e., having a substantial amount of secondary and tertiary structure) mineral filter aid product such as diatomaceous earth. However, less structured products such as perlite and the like, though generally somewhat inferior in performance, may also be reduced to the essential particle classification and utilized in the practice of this invention. In other words, diatomaceous earth, because of the very high permeability of each discrete particle, is typically preferred over perlite and similar filter aids, and it is therefore, likewise preferred in the instant application.

Admixture of the finely divided filter body aids with the materials to be filtered may be effected by any convenient or practical conventional technique, manual or automatic, for proportionately adding or feeding and mixing the particulate filter aid material to a liquid.

The addition of a finely divided filter aid material sized according to this invention, i.e., a particulate material having at least about one-half of its particles of an average effective diameter less than 5 microns, in the practice of a typical rotary precoat filter procedure utilizing a deep cake or precoat filtering medium provides a substantial increase in filtrate flow rate of, for example, up to about 50% and/or a reduction of the overall filter aid consumed while maintaining at least equivalent clarity or turbidity reduction.

The following examples serve to illustrate this invention and the advantages thereof but not to limit or in any way confine the same. Thus, it should be specifically understood that the compositions of particular filter aids specified and of the liquid or solid components of the filtered suspension or slurry are neither part of this invention nor are they to be construed as limiting the same.

The following examples each comprise operating data compiled from the filtration of a suspension comprising antibiotic broth in a conventional rotary vacuum filter device wherein each cycle is effected with the typical, initially relatively thick (approximately 2″) precoat filter medium or cake having at least about 75% of its average effective particles of a diameter greater than 5 microns and substantially all of said particles of a diameter less than about 20 microns. The precoat filter medium of Examples I and II consisted of a particulate diatomaceous earth filter aid (Johns-Manville's Hyflo Super-Cel Filter Aid) while that of Example III consisted of a particulate expanded perlite type filter aid (Sil-Flo Filter Aid, a product of Silflo Corporation). The finely divided body aid, or filter aid admixed directly with the antibiotic broth prior to filtering in each of the following examples consisted of a particulate diatomaceous earth sold under the Johns-Manville trademark of Filter-Cel and having the following particles size distribution expressed as percentages of particles having the indicated diameter in microns ($\mu$).

| >40$\mu$ | 40–20$\mu$ | 20–10$\mu$ | 10–8$\mu$ | 8–6$\mu$ | 6–4$\mu$ | 4–2$\mu$ | 2–1$\mu$ | 1–0.5$\mu$ | <0.5$\mu$ |
|---|---|---|---|---|---|---|---|---|---|
| 4.5% | 4.5% | 9.5% | 5.5% | 10.0% | 21.0% | 23.0% | 10.5% | 7.0% | 4.5% |

*Example I*

The filter system described hereinbefore, operating under the specified conditions both with and without the specified additional body aid of this invention, provided the following data:

| Additional Body Aid | Filter Chamber, r.p.m. | Depth of Knife Cut/ Revolution, inches | Flow rate, gal./ sq. ft./hr. |
|---|---|---|---|
| None | 1/2 | 0.003 | 2.5 |
| 100 lbs./1,000 gal | 1/2 | 0.003 | 3.8 |

The clarity of filtrate produced by the run including the additional body aid was somewhat clearer than the filtrate produced without the additional body aid.

*Example II*

The foregoing filtrate system, both with and without the indicated amount of additional body aid, produced the following data while emitting respective filtrates of like clarity.

| Additional Body Aid | Filter Chamber, r.p.m. | Depth of Knife Cut/ Revolution, inches | Flow rate, gal./ sq. ft./hr. |
|---|---|---|---|
| None | 1 | 0.003 | 4.3 |
| 100 lbs./1,000 gal | 1 | 0.0012 | 4.6 |
| 100 lbs./1,000 gal | 1 | 0.0024 | 6.1 |

*Example III*

The same filter system, provided with a perlite precoat of a like depth, operated as specified hereinafter with and without additional body aid, provided filtrates of somewhat inferior clarity to those of the foregoing examples.

| Additional Body Aid | Filter Chamber, r.p.m. | Depth of Knife Cut/ Revolution, inches | Flow rate, gal./ sq. ft./hr. |
|---|---|---|---|
| None | 1 | 0.0062 | 3.1 |
| 50 lbs./1,000 gals | 1 | 0.0042 | 3.75 |

Thus, the foregoing specific examples, demonstrating the filtration of very difficult to filter organic suspensions, establish the substantial increases of filter flow rates, e.g., up to about 50%, and/or reductions in total or overall filter aid consumption provided by this invention without diminishing the clarification qualities of the filtrate.

It will be understood that the details given are for the purpose of illustration and not restriction, and that variations within the spirit of this invention are intended to be included within the scope of the appended claims.

What we claim is:

1. In a rotary precoat filtration procedure wherein the revolving filter means comprises a precoat of an initial substantial depth of filter cake consisting essentially of a relatively coarse particulate filter aid having at least 75% of its particles of an average effective diameter between 5 microns and 20 microns and a constantly advancing doctor knife continuously cuts away and removes the portion of the said precoat filter aid containing entrapped and accumulated filtered solids simultaneously with filtration, the improvement which comprises admixing a relatively fine particulate filter aid having at least 45% of its particles of an average effective diameter between 0 and 4 microns with a suspension to be filtered in amount of approximately 25 to 100 pounds of filter aid per thousand gallons of suspension, whereby the accretion of relatively fine filter aid on the filter surface cooperates with the relatively coarse particles of the precoat to modify the mechanical action of the filter cake and reduces total over-all filter aid consumption.

2. The method of claim 1 wherein the particulate filter aid admixed with the suspension to be filtered comprises filter aid selected from the group consisting of diatomaceous earth and perlite and mixtures thereof having the following approximate size classification:

| Percent of particles: | Particle diameter in microns |
|---|---|
| 4.5 | Greater than 40. |
| 4.5 | 40–20. |
| 9.5 | 20–10. |
| 5.5 | 10–8. |
| 10.0 | 8–6. |
| 21.0 | 6–4. |
| 23.0 | 4–2. |
| 10.5 | 2–1. |
| 7.0 | 1–0.5. |
| 4.5 | Less than 0.5. |

References Cited in the file of this patent

UNITED STATES PATENTS

| 1,632,458 | Thatcher | June 14, 1927 |
| 1,756,906 | Miketta | Apr. 29, 1930 |
| 2,083,887 | Wieneke | June 15, 1937 |
| 2,308,716 | Re Qua | Jan. 19, 1943 |
| 2,665,813 | Bollaert et al. | Jan. 12, 1954 |
| 2,798,674 | Denning | July 9, 1957 |
| 2,829,773 | Saddington | Apr. 8, 1958 |